(12) United States Patent
Sobhy

(10) Patent No.: US 9,288,102 B2
(45) Date of Patent: Mar. 15, 2016

(54) CONTROLLING DEVICES USING CLOUD SERVICES AND DEVICE-AGNOSTIC PIPE MECHANISMS

(71) Applicant: Microsoft Corporation, Redmond, WA (US)

(72) Inventor: Ehab Sobhy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 13/769,392

(22) Filed: Feb. 18, 2013

(65) Prior Publication Data

US 2014/0237092 A1    Aug. 21, 2014

(51) Int. Cl.
*H04L 29/08* (2006.01)
*G06J 3/00* (2006.01)
*H04Q 1/50* (2006.01)
*H04L 12/46* (2006.01)

(52) U.S. Cl.
CPC ............. *H04L 29/08567* (2013.01); *G06J 3/00* (2013.01); *H04L 12/4633* (2013.01); *H04Q 1/50* (2013.01); *H04Q 2209/10* (2013.01)

(58) Field of Classification Search
CPC ....... G06F 15/16; G06F 15/167; G06F 15/17; G06F 15/177; G06F 3/00; G06F 11/00; G06F 17/00; G06F 13/14; G06F 15/00; G06F 19/00; H04L 49/00; H04L 49/15; H04L 49/1546; H04L 49/40; H04L 49/405; H04L 49/45; H04L 49/60; H04L 61/00; H04L 61/60; H04L 61/6077; H04L 61/6086; H04L 65/00–65/1003; H04L 67/00–67/025; H04L 67/12; H04L 67/125; H04Q 1/00; H04Q 1/028; H04Q 1/03; H04Q 1/28; H04Q 1/30; H04Q 1/44; H04Q 1/50; H04Q 3/00; H04Q 3/0016–3/0029; H04Q 3/0045; H04Q 3/54–3/54516; H04Q 3/54541; H04Q 3/58; H04Q 2209/00–2209/43; H04Q 2209/88
USPC .......... 709/201, 203, 208, 220, 221, 222, 223
See application file for complete search history.

(56) References Cited

U.S. PATENT DOCUMENTS

| | | | | |
|---|---|---|---|---|
| 5,606,493 A * | 2/1997 | Duscher et al. | .................... | 700/5 |
| 5,778,189 A * | 7/1998 | Kimura et al. | ................ | 709/236 |
| 5,787,245 A * | 7/1998 | You et al. | .................... | 714/38.13 |
| 6,128,733 A * | 10/2000 | Miyaguchi et al. | ................ | 713/2 |
| 6,269,473 B1 * | 7/2001 | Freed et al. | .................... | 717/104 |
| 6,457,081 B1 * | 9/2002 | Gulick | .......................... | 710/305 |
| 6,539,433 B1 * | 3/2003 | Tominaga et al. | ............. | 709/246 |
| 6,629,166 B1 * | 9/2003 | Grun | ............................... | 710/36 |
| 6,633,929 B1 * | 10/2003 | Hyder et al. | .................... | 710/62 |

(Continued)

OTHER PUBLICATIONS

Building vs. Buying a Personal Computer, Mark Kyrnin, compreviews, Aug. 2004.*

(Continued)

*Primary Examiner* — Brian J Gillis
*Assistant Examiner* — Boris Grijalva Lobos
(74) *Attorney, Agent, or Firm* — Sandy Swain; Micky Minhas

(57) ABSTRACT

An environment is described in which a cloud-implemented service system controls a plurality of target devices via a plurality of respective device-agnostic pipe mechanisms. The target devices themselves may represent "dumb" devices, e.g., lacking local control logic, or providing reduced reliance on local control logic. Users may interact with the service system via applications running on any type of user devices.

20 Claims, 10 Drawing Sheets

(56) References Cited

U.S. PATENT DOCUMENTS

| | | | |
|---|---|---|---|
| 6,763,226 B1* | 7/2004 | McZeal, Jr. | 455/90.2 |
| 6,922,598 B2* | 7/2005 | Lim et al. | 700/90 |
| 7,383,325 B2* | 6/2008 | Lim et al. | 709/220 |
| 7,440,408 B1* | 10/2008 | Anderson | 370/252 |
| 7,660,871 B2* | 2/2010 | Koh et al. | 709/217 |
| 7,797,733 B1* | 9/2010 | Sallam | 726/4 |
| 8,010,993 B1* | 8/2011 | Bartholomay et al. | 726/1 |
| 8,040,888 B1* | 10/2011 | MacAdam et al. | 370/392 |
| 8,250,215 B2 | 8/2012 | Stienhans et al. | |
| 8,355,826 B2* | 1/2013 | Watson et al. | 700/291 |
| 8,634,573 B2* | 1/2014 | Igoe | 381/81 |
| 8,892,767 B1* | 11/2014 | Yi et al. | 709/237 |
| 2002/0161946 A1* | 10/2002 | Odenwald et al. | 710/33 |
| 2003/0093404 A1* | 5/2003 | Bader et al. | 707/1 |
| 2003/0172077 A1* | 9/2003 | Moussavian | 707/100 |
| 2003/0182404 A1* | 9/2003 | Saint-Etienne et al. | 709/220 |
| 2003/0203734 A1* | 10/2003 | Igloi et al. | 455/431 |
| 2004/0005859 A1* | 1/2004 | Ghercioiu et al. | 455/3.01 |
| 2004/0143641 A1* | 7/2004 | de Jong | 709/213 |
| 2005/0076125 A1 | 4/2005 | Weber et al. | |
| 2005/0261816 A1* | 11/2005 | DiCroce et al. | 701/36 |
| 2007/0260331 A1* | 11/2007 | Rouhier et al. | 700/17 |
| 2007/0286181 A1* | 12/2007 | Bushmitch et al. | 370/356 |
| 2007/0294593 A1* | 12/2007 | Haller et al. | 714/45 |
| 2007/0300057 A1* | 12/2007 | Corcoran et al. | 713/154 |
| 2008/0080552 A1 | 4/2008 | Gates et al. | |
| 2008/0172479 A1* | 7/2008 | Majanen et al. | 709/221 |
| 2009/0199203 A1* | 8/2009 | Knaster et al. | 719/313 |
| 2009/0305789 A1* | 12/2009 | Patil | 463/42 |
| 2010/0168914 A1* | 7/2010 | Kang et al. | 700/248 |
| 2011/0244919 A1* | 10/2011 | Aller et al. | 455/556.1 |
| 2011/0295978 A1* | 12/2011 | Pazos et al. | 709/219 |
| 2012/0065787 A1* | 3/2012 | Broniak et al. | 700/287 |
| 2012/0105249 A1* | 5/2012 | Bauerfeld et al. | 340/870.02 |
| 2012/0109395 A1* | 5/2012 | Finch et al. | 700/295 |
| 2012/0117271 A1* | 5/2012 | Kennedy et al. | 709/248 |
| 2012/0151104 A1* | 6/2012 | Bratt et al. | 710/26 |
| 2012/0173763 A1* | 7/2012 | Kim et al. | 710/5 |
| 2012/0246319 A1 | 9/2012 | Um et al. | |
| 2012/0254960 A1 | 10/2012 | Lortz et al. | |
| 2013/0035077 A1* | 2/2013 | Tsai | 455/414.1 |
| 2013/0183944 A1* | 7/2013 | Mozer et al. | 455/414.1 |
| 2013/0201316 A1* | 8/2013 | Binder et al. | 348/77 |
| 2013/0268437 A1* | 10/2013 | Desai et al. | 705/41 |
| 2014/0047124 A1* | 2/2014 | Simcoe et al. | 709/232 |
| 2014/0157355 A1* | 6/2014 | Clancy et al. | 726/1 |
| 2014/0201321 A1* | 7/2014 | Donaghey et al. | 709/217 |

OTHER PUBLICATIONS

Kyrnin ,Building vs. Buying a Personal Computer, compreviews, Aug. 2004.*

PCT Search and Written Opinion in PCT/US2014/016153, mailing date Jun. 25, 2014, 10 pages.

Feilong, et al., "Cloud-Pipe-Device: Integration for Success," retrieved at <<http://www.huawei.com/in/static/hw-104296.pdf>>, Strategic Transformation, Issue 62, Nov. 2011, 3 pages.

Partridge, Brian, "The Mobile Cloud: Unlocking New Profits," retrieved at <<http://www.neustar.biz/corporate/docs/the_mobile_cloud_unlocking_new_profits.pdf>>, Yankee Group Research Group, Feb. 2011, 11 pages.

Huang, et al., "The Convergence of Information and Communication Technologies Gains Momentum," retrieved at <<http://www3.weforum.org/docs/GITR/2012/GITR_Chapter1.2_2012.pdf>>, The Global Information Technology Report 2012, 2012 Word Economic Forum, Chapter 1.2, retrieved on Dec. 20, 2012, pp. 35-45.

"Mobile Applications Realization: The Challenge & Opportunities for the 4G Wireless Ecosystem, Part 2," retrieved at <<http://www.globalccf.org/sites/default/files/Mobile%20Applications%20Realization%20Part%20%202.pdf>>, CDMA Certification Forum, retrieved on Dec. 12, 2012, 15 pages.

International Preliminary Report on Patentability mailed Feb. 6, 2015 from PCT Patent Application No. PCT/US2014/016153, 12 pages.

PCT Demand/Response filed Oct. 22, 2014 to the International Search Report & Written Opinion mailed Jun. 25, 2014 from PCT Patent Application No. PCT/US2014/016153, 17 pages.

Voluntary Amendment filed Aug. 6, 2015 from European Patent Application No. 14709002.1, 37 pages.

* cited by examiner

CONTROLLING DEVICES USING CLOUD SERVICES AND DEVICE-AGNOSTIC PIPE MECHANISMS

BACKGROUND

Some device manufacturers have attempted to make their devices more "intelligent" by embedding processing modules into the devices. For example, a high-end automobile manufacturer may produce a control system that is driven by one or more processing modules. Each processing module may run one or more applications. A user may interact with these applications via an on-board display device, such as an LCD display or the like. The user may also program the applications through this manner of interaction.

Some device manufacturers also provide devices that have the ability to interact with remote functionality. For example, a control system of an automobile may couple its processing modules to a remote server. Applications running on the control system may exchange data with this remote functionality for various purposes, e.g., to receive maps, media content, etc.

The above control strategies provide consumers with more versatile and complex devices. However, for reasons specified herein, these strategies also have potential drawbacks.

SUMMARY

An environment is described herein that includes a service system that hosts one or more services. The services provide logic which controls the operation of a plurality of target devices. This strategy eliminates the need for the target devices to provide local "embedded" intelligence. In other words, in one implementation, the target devices may be produced as "dumb" equipment which lacks (or has limited reliance on) local control logic.

According to one illustrative aspect, the services are coupled to the target devices via respective pipe mechanisms. The pipe mechanisms handle the flow of data from the target devices to the service system, and the flow of control instructions from the service system to the target devices. In one implementation, the pipe mechanisms are constructed in a device-agnostic manner. This means that any pipe mechanism is capable of interacting with plural types of target devices, without regard to the native functionality provided by the target devices.

According to another illustrative aspect, the device-agnostic pipe mechanisms can be supplied to device manufacturers. The device manufacturers can then incorporate the pipe mechanisms into their respective target devices. Alternatively, or in addition, the pipe mechanisms can be supplied to end users of target devices. The end users may then couple the pipe mechanisms to the target devices in a detachable manner. In one implementation, each pipe mechanism may be pre-programmed to interact with the service system, e.g., by storing the address of the service system in its data store. Each pipe mechanism may also include functionality that enables it to interact with the service system in a secure manner; for example, the interaction may utilize the Transport Layer Security (TLS) protocol, and/or some other security protocol or mechanism.

According to another illustrative aspect, a user may interact with a service via an application that runs on any user device, such as a smart phone, a tablet device, a personal computer, etc. Through this channel, the user may configure the service to control the user's target device in a desired manner.

According to another illustrative aspect, the service system may provide set-up functionality that allows a user to establish a nexus between a user account, a particular target device, and the pipe mechanism associated with the target device.

The above control strategies can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
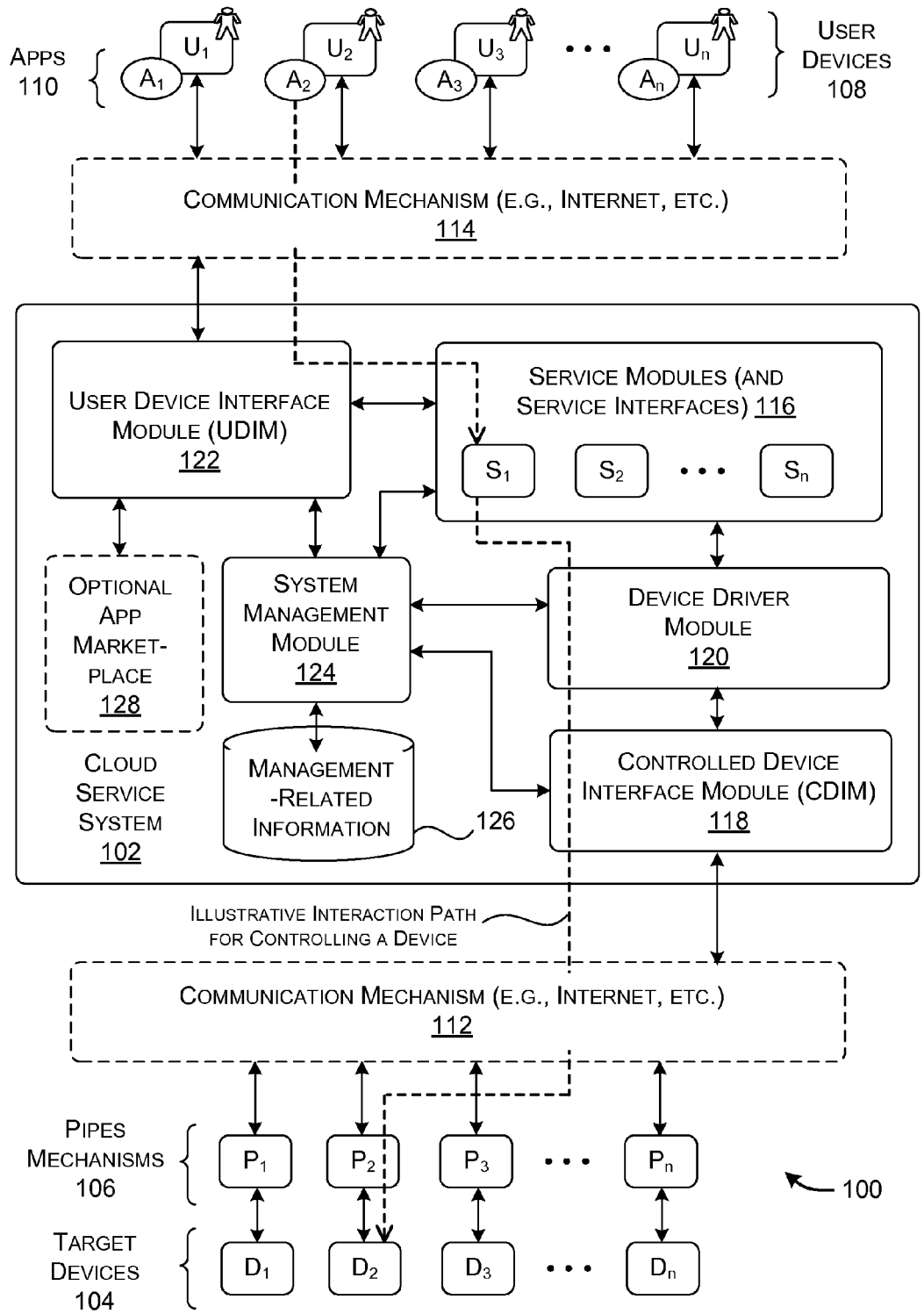
FIG. 1 shows an illustrative environment in which a service system interacts with a plurality of target devices via a plurality of pipe mechanisms, for the purpose of controlling the target devices.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative environment for controlling target devices using a service system and device-agnostic pipe mechanisms. Section B describes illustrative methods which explain the operation of the functionality of Section A.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIGS. 1-7, to be described in turn, provide additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Environment FIG. 1 shows an illustrative environment 100 in which a service system 102 interacts with a plurality of target devices 104 ($D_1, D_2, \ldots D_n$) via a plurality of respective pipe mechanisms 106 ($P_1, P_2, \ldots P_n$). A plurality of users may also interact with the service system 102 using a plurality of user devices 108 ($U_1, U_2, \ldots U_n$) running applications 110 ($A_1, A_2, \ldots A_n$). Users can control the target devices 104 through these channels. For example, a user can interact with an application to program a service hosted by the service system 102. Based on that programming, the service may then send instructions to a target device that have the effect of controlling the target device. The service may also receive data from the target device. Generally, the devices 104 are referred to as "target" devices to indicate that they represent the target of control, and to distinguish these target devices 104 from the user devices 108.

Each pipe mechanism serves a control-agnostic role of passing information between a target device and the service system 102. The pipe mechanism is said to be control-agnostic because it is not configured to perform any particular control function(s), or to interpret the information that passes through it with respect to any particular control regimen. Rather, it may be used in the context of any type of control regimen.

Moreover, each pipe mechanism is constructed in a device-agnostic manner. This means that each pipe mechanism has the capacity to interact with different kinds of target devices 104, irrespective of the native functionality provided by the target devices 104. In one case, the environment 100 achieves this result by hosting a set of identically-constructed pipe mechanisms 106. That is, in this case, each pipe mechanism has the same hardware and programming as other pipe mechanisms. In another case, the environment 100 provides different classes of pipe mechanisms 106. Each class may differ from the others by accommodating a different type of communication, such as cellular communication, satellite communication, WiFi communication, communication via hardwired connection, etc.

The environment 100 offers one or more potential benefits. First, the environment 100 delegates the "intelligence" associated with a control task to the service system 102, rather than each individual target device. As a result, the environment 100 gives the device manufacturers the freedom to produce target devices 104 that are—to varying degrees—considered "dumb." A dumb device refers to a device that lacks processor-implemented intelligence and/or other facets of local-implemented control. The environment 100 also allows the device manufacturers to eliminate or reduce input/output mechanisms that are typically used by intelligent devices, e.g., to program and interact with these devices. These aspects, in turn, may reduce the complexity and cost of the manufacturing process.

Second, the environment 100 provides a uniform and standard framework for controlling different kinds of target devices 104. This aspect, in turn, may benefit device manufacturers and end users alike by reducing the complexity and cost associated with the task of controlling plural target devices 104. For example, the environment 100 frees an end user from the responsibility of learning different control protocols associated with different target devices. The environment 100 also offers the end user a more convenient mechanism for programming each target device (to be described below), compared to interacting with the input/output mechanism associated with the target device itself.

The above advantages are cited by way of example, not limitation. Other implementations of the environment 100 may offer additional technical advantages.

Figure 2:
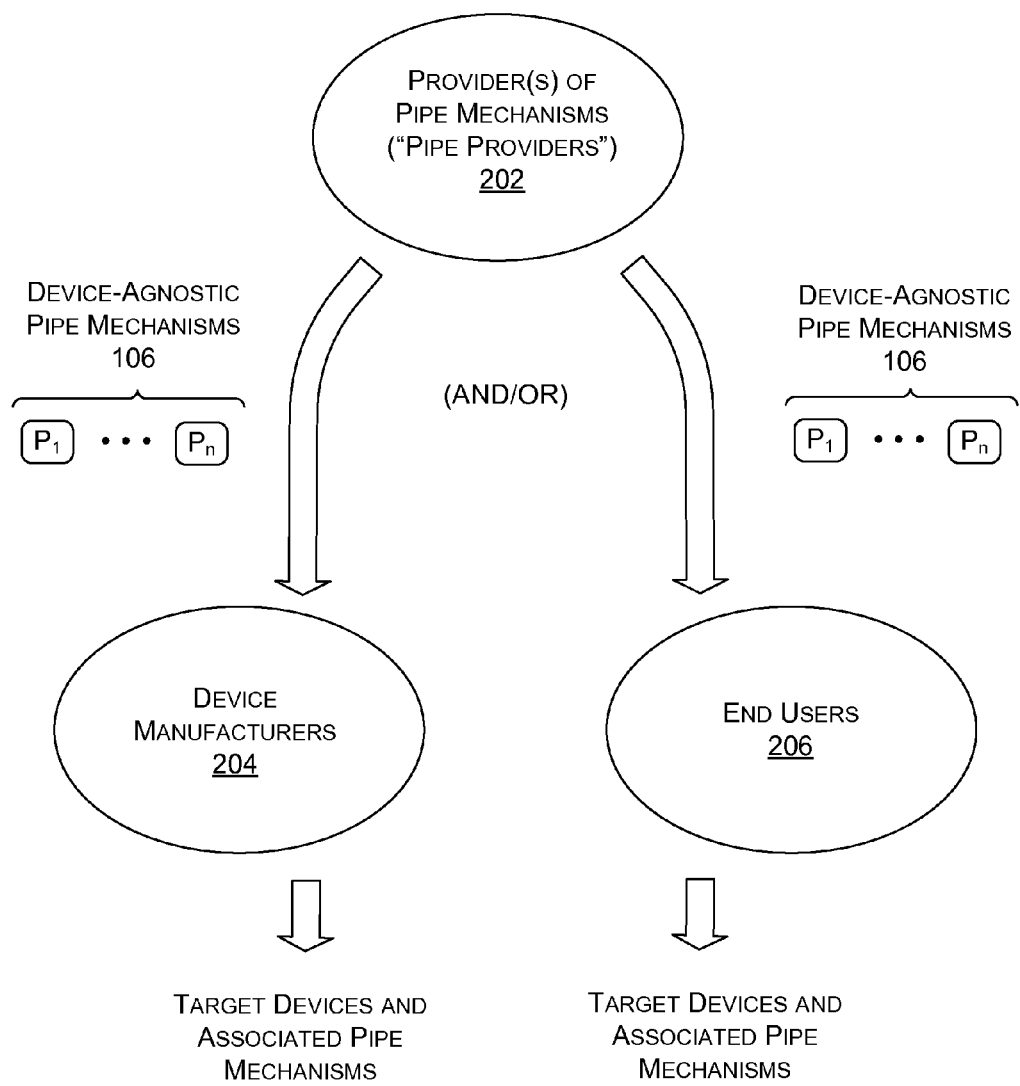
FIG. 2 provides a high-level summary of two strategies for providing pipe mechanisms to recipients (device manufacturers and end users, respectively).

Jumping ahead momentarily in the sequence of figures, consider the high-level conceptual overview provided in FIG. 2. That figure shows two strategies that may be used to provide the pipe mechanisms 106 to device manufacturers (in the case of option A) and end users (in the case of option B). In both options, an entity (or entities) which provide the pipe mechanisms is referred to as a pipe provider 202. In one case, the pipe provider 202 corresponds to the same entity which provides and administers the service system 102. In another case, the pipe provider 202 and the entity which hosts the service system 102 are two different respective entities. That is, in this embodiment, a first business enterprise can produce the pipe mechanisms, while a second business enterprise can operate the service system 102.

In option A, the pipe provider 202 can provide the pipe mechanisms 106 to device manufacturers 204. (Here, the term "device manufacturer" encompasses manufacturers which produce target devices from "scratch" based on raw materials, as well as manufacturers which assemble target devices from smaller pre-constructed components, as well as manufacturers which perform a combination of these activities.) The device manufacturers 204 may add the pipe mechanisms 106 to the target devices 104 as part of the manufacturing process of the target devices 104. The device manufacturers 204 can use different strategies to achieve this result. In one case, the device manufacturers can embed pipe mechanisms as fixed components of target devices. In another case, the device manufacturers can add the pipe mechanisms as detachable components of the target devices. In either case, the device manufacturers offer target devices 104 to end users which include the pipe mechanisms 106 already installed therein.

In option B, the pipe provider 202 can provide the pipe mechanisms 106 to end users 206. The end users 206 may then add the pipe mechanisms 106 to the target devices 104. For example, the device manufacturers 204 can produce a kind of target device that has a mating slot or other type of interface which accommodates the later attachment of a pipe mechanism. An end user may purchase such a target device, and then, optionally, later purchase a pipe mechanism for use in conjunction with the target device. The end user may then couple the pipe mechanism to the target device via the interface that is provided by the target device. Alternatively, the end user may remove an existing pipe mechanism that is currently coupled to the target device and replace it with an updated or enhanced version of the pipe mechanism.

The two strategies identified above are cited by way of example, not limitation. Still other strategies may be used to supply the pipe mechanisms 106 to entities for use in conjunction with the target devices 104.

In either of the above cases, the entity which hosts the service system 102 ("the hosting entity") can ask the recipient of a pipe mechanism to agree to the terms of a license agreement in order to use the pipe mechanism. For instance, the recipient may correspond to a device manufacturer or an end user. In one approach, the host entity can request the recipient to pay a single lump sum in order to use a pipe mechanism. This type of license may be the most appropriate option for a device manufacturer. In another case, the host entity can request the recipient to pay a periodic fee (e.g., a monthly fee) to use a pipe mechanism. In another case, the host entity can request the recipient to pay a usage-based fee to use a pipe mechanism. For example, the hosting entity can monitor the amount of data that passes through a pipe mechanism (in an upstream and/or downstream direction), and then compute a monthly fee that is based on this amount.

In another approach, the hosting entity can allow the recipients to use the pipe mechanisms 106 without payment of a fee. In this case, the hosting entity may provide advertisements to the end users who visit the service system 102 for any reason, e.g., to obtain new applications, or to configure services. The hosting entity can collect advertising fees from the advertisers. In addition, or alternatively, the hosting entity can use the advertisements to direct online traffic to other products and services which it offers. Still other approaches are possible by which the hosting entity can monetize the use of the pipe mechanisms 106, even if it does not itself manufacture or distribute the pipe mechanisms 106.

Returning to FIG. 1, the components in this figure will now be described in detail. Starting with the target devices 104, these devices can represent any type of functionality. For example, a subset of the target devices 104 may correspond to appliances or other equipment provided in homes. Such target devices encompass lighting mechanisms, locks, garage door openers, automated shades, security equipment, heaters, air conditioning units, humidifiers, laundry equipment (dryers, clothes washers, etc.), kitchen equipment (refrigerators, stoves, ovens, fan vents, blenders, coffee makers, etc.), bathroom equipment (hair dryers, electric toothbrushes, shaving equipment, etc.), media equipment (televisions, music-playing equipment, etc.), game-playing equipment, toys, irrigation equipment, pool-related equipment, and so on. Other target devices correspond to equipment provided in a vehicle of any type. Other target devices correspond to equipment provided in a business environment of any type, including a warehouse environment, a manufacturing environment, a care-giving environment (e.g., a hospital), a government-related environment of any type, and education-related environment of any type, and so on. The target devices 104 can encompass yet other types of equipment for use in any environment.

As noted above, in some cases, the target devices 104 may include "dumb" equipment that lacks local processor-implemented control mechanisms or other facets of local control logic. Processor-implemented control mechanisms include, for instance, microprocessors, application-specific integrated circuits, and so on. A simple light switch is an example of a dumb device. A door lock is another example of a dumb device. In other cases, the target devices 104 may include equipment having some local control logic. A security system is an example of a device that may employ some local control logic. In these cases, the service system 102 provides services which supplement the local intelligence of the target devices.

As will be described in greater detail below in connection with FIG. 4, each pipe mechanism can include a device interface mechanism for interacting with a target device, and a service interface mechanism for interacting with the service system 102. Each pipe mechanism may also include a processing module, together with a data store.

The pipe mechanisms 106 may interact with the service system 102 via any communication mechanism 112, such as a wide area network (e.g., the Internet), a local area network, a point-to-point connection, and so on, or any combination thereof. More specifically, each pipe mechanism can connect to the communication mechanism 112 in different ways. Without limitation, a pipe mechanism can connect to the communication mechanism 112 via wireless link(s) (e.g., cellular communication of any type, WiFi communication, satellite communication, etc.) and/or hardwire link(s) (e.g., a broadband connection of any type, a dial-up modem connection, etc.).

The user devices 108 may correspond to different types of computing units, including, but not limited to, personal computers, computer work stations, lap top computers, tablet-type computers, personal digital assistant devices, mobile telephones of any type (e.g., smart phones), non-mobile telephones of any type, electronic book reader devices, set-top box devices, game-playing consoles, portable game-playing devices, and so on. The applications 110 may correspond to software-implemented logic that can be downloaded from the service system 102 (and/or elsewhere) and stored in data stores provided by the user devices 108. Alternatively, or in addition, the applications 110 may correspond to hardware-implemented logic provided by the user devices 108.

The user devices 108 may interact with service system 102 via any communication mechanism 114, such as a wide area network (e.g., the Internet), a local area network, a point-to-point connection, and so on, or any combination thereof. More specifically, the user devices 108 can connect to the communication mechanism 114 using any of the techniques described above with respect to the communication mechanism 112. (Note that the communication mechanism 114 may represent the same network as the communication mechanism 112; these mechanisms are shown as distinct in FIG. 1 to merely facilitate illustration and explanation.)

The service system 102 may correspond to any computer functionality that is accessible via the communication mechanisms (112, 114). For example, the service system 102 may correspond to one or more servers in conjunction with one or more data stores. That is, colloquially speaking, the service system 102 can be implemented by cloud computing resources that are accessible via the Internet or other wide area network. The components of the service system 102 can be provided at a single site, or distributed over plural sites.

The service system 102 hosts a collection of service modules 116 ($S_1$, $S_2$, ... $S_n$). Each service module, in turn, provides a service that governs the manner in which a class of target devices operates. For example, a first service may provide scheduling logic which turns a type of lighting mechanism on and off at various times during the day. A second service may turn a type of irrigation system on and off at various times during the day. A third service may control a type of oven, e.g., by turning it on and off at certain times of the day, and setting the cooking temperature to a specified value while in its "on" state. Many other examples are possible.

In general, some services may control target devices by providing binary on/off-type decisions. In addition, or alternatively, other services may control target devices by setting values within a continuous range of values or within a discrete set of values (as in the above-mentioned oven example). Other services may provide yet other types of control instructions to the target devices 104.

Some services may provide their control without taking into consideration the operational state of the affected target devices. This may be the case, for instance, for services that control simple light switches. Other services may take the state of the target devices into account. For example, consider a service which controls a thermostat. That service may receive a reading from a temperature gauge, which reflects the current temperature within a room. In response to this reading, the service may increase or decrease the temperature, or maintain the temperature at its current value.

Some services may also receive information from external sources, meaning sources other than the target devices 104. For example, a service that controls an irrigation system may receive information from a website that provides weather information. The service can take that information into account when controlling the irrigation system, e.g., by reducing the amount of water that is applied to a lawn when rain is expected on a particular day.

Although not specifically enumerated in the figure, the service system 102 can also provide one or more interfaces that allow the applications 110 to interact with each service module. For example, each interface may be implemented as an application programming interface (API) or the like.

A user may use an application, running on the user's device, to configure a service in a particular manner. For example, a user can interact with a security application to identify the circumstances in which the user's home security system will generate an alarm. The associated service may then interact with the home security system based on the configuration information provided by the user. As noted above, a user may find that this method of controlling a device is more efficient and user-friendly, compared to directly interacting with local control logic provided by the device itself.

More specifically, a first communication flow can handle the exchange of information between the pipe mechanisms 106 and the service modules 116. A second communication flow can handle the exchange of information between the user devices 108 and the service modules 116. FIG. 1 shows an instance of the first and second communication flows in dashed lines. In the second communication flow, a user uses an application $A_2$ on a user device $U_2$ to configure a service $S_1$. In the first communication flow, the service $S_1$ sends control instructions to a device $D_2$ via a pipe $P_2$. A controlled device interface module (CDIM) 118, a device driver module 120, and a user device interface module (UDIM) 122 implement aspects of the above-described first and second communication flows.

More specifically, the CDIM 118 can provide different mechanisms for implementing different message transfer protocols. For instance, consider a first case in which a pipe mechanism interacts with the service system 102 on a continuous-connection basis. The CDIM 118 can accommodate this mode by immediately passing instructions to the pipe mechanism as soon as those instructions are received from the service modules 116, and by immediately passing data to the service modules 116 as soon as that data is received from the pipe mechanism.

Consider a second case in which a pipe mechanism interacts with the service system 102 on an intermittent-connection basis. For example, the pipe mechanism may connect to the service system 102 every n seconds or minutes, or on an event-driven basis (e.g., when an event occurs that warrants interaction between the pipe mechanism and the service system 102). The CDIM 118 can accommodate this type of pipe mechanism using a queuing mechanism to store instructions to be passed to the pipe mechanism. When it comes time to establish a connection with the pipe mechanism, the CDIM 118 can transfer any outstanding instructions that are provided in its queue to the pipe mechanism.

The CDIM 118 can use a pull-based and/or push-based technique to interact with a pipe mechanism. In a push-based technique, the CDIM 118 initiates transfer of control instructions to the pipe mechanism. In a pull-based technique, the CDIM 118 relies on the pipe mechanism to pull the instructions from the service system 102. Similarly, in a push-based technique, the CDIM 118 relies on the pipe mechanism to push data to the service system 102. In a pull-based technique, the CDIM 118 actively pulls data from the pipe mechanism. Still other transfer strategies are possible.

The device driver module 120 provides driver mechanisms that allow the server modules 116 to control different types of target devices 104. For instance, the device driver module 120 may use a first kind of driver mechanism to convert control instructions into an appropriate form for use in controlling a relatively simple lighting mechanism. The device driver module 120 may use a second kind of driver mechanism to convert control instructions into an appropriate form for use in controlling a more complex and versatile lighting switch, e.g., a lighting switch which incorporates a dimming function in addition to an on-off function. From a high-level perspective, the device driver module 120 allows each service to be constructed in a device-agnostic manner, e.g., without taking into account the particular nature of the native functionality provided by the target devices 104.

The UDIM 122 allows a user to forward information to the services module 116, and allows the service modules 116 to send information to the user. The UDIM 122 can accommodate multiple modes of interconnection in the same manner as the CDIM 118, e.g., by accommodating continuous and intermittent connectivity.

A system management module 124 controls different aspects of the service system 102. The system management module 124 can perform this function based on information stored in a data store 126. According to one management function, the system management module 124 can establish an association between a particular target device, its pipe mechanism, and a user account. For example, the user account may be associated with a user who owns or is otherwise authorized to control the target device under consideration.

The system management module 124 can use different protocols to establish the above-described association. In one non-limiting protocol, a user who wishes to register a new target device may access the system management module 124 via a user device, e.g., by logging onto a web site associated with the system management module 124. Through that connection, the user may: (1) identify himself or herself; (2) identify the type of target device that is being registered; and/or (3) identify the pipe mechanism that is coupled to the target device. A user may also connect the target device's pipe mechanism to the service system 102. Through that connection, the pipe mechanism can provide additional identifying information to the service system 102 regarding itself and/or the target device. For example, the pipe mechanism can transmit one or more identifying codes, a digital certificate and/or other information which helps authenticate the identity of the pipe mechanism and/or the target device. Based on this collected information, the system management module 124 may establish a link that relates the target device, the pipe mechanism, and a user account associated with the user. The system management module 124 can store the collected information in the data store 126. The user is thereafter permitted to control his or her target device via the service system 102.

For example, consider the particular case in which the pipe mechanism is a permanent part of the new target device. A device manufacturer may convey a code associated with the new target device in paperwork that accompanies the sale of the new target device, or by affixing the code to the new target device itself in any manner. In this case, it may be sufficient for the user to provide a single code associated with the target device, as this code also implicitly identifies the pipe mechanism that is associated with the target device. In another case, the pipe mechanism may be an independent component that can be attached to any target device. In this case, the user may provide two codes during the registration process, a first code associated with the pipe mechanism and a second code associated with the target device.

The system management module 124 may also set up a secure connection with the pipe mechanism using any security mechanism, such as, but not limited to, the Transport Layer Security (TLS) protocol (or the predecessor protocol, Secure Sockets Layer (SSL)). In this protocol, the system management module 124 and the pipe mechanism exchange security information to establish a secure connection. Data and instructions may thereafter be transmitted between the service system 102 and the pipe mechanism in a secure form.

Finally, the service system 102 may provide an application marketplace 128. Or a separate system (not shown) may provide the application marketplace 128. The application marketplace 128 offers a collection of applications that provide different control functions associated with different types of target devices. For example, a user who owns a coffee maker may search the application marketplace 128 for an application that is designed to control this kind of device. The user can then download this application and use it to control his or her coffee maker. Some coffee makers may be more complex than others. Hence, the user may seek out an application that is most aptly suited for the kind of coffee maker that he or she owns.

FIGS. 3-6 show three different ways that a pipe mechanism may be coupled to a device. Beginning with FIG. 3, a target device 302 includes any native device functionality 304 and a pipe interface mechanism 306. The native device functionality 304 represents any functions performed by the target device 302. The pipe interface mechanism 306 provides any mechanism by which the native device functionality 304 may interact with a pipe mechanism 308. For example, in one non-limiting case, the pipe interface mechanism 306 may correspond to a relay which is connected to various switches provided by the native device functionality 304. The relay, in turn, is controlled by the pipe mechanism 308.

In some cases, the target device 302 may already provide the pipe interface mechanism 306 as part of its pre-existing ("legacy") design. In other cases, a device manufacturer may modify its legacy design to provide the pipe interface mechanism 306, so that the target device 302 can successfully interact with the pipe mechanism 308.

Figures 3, 4:
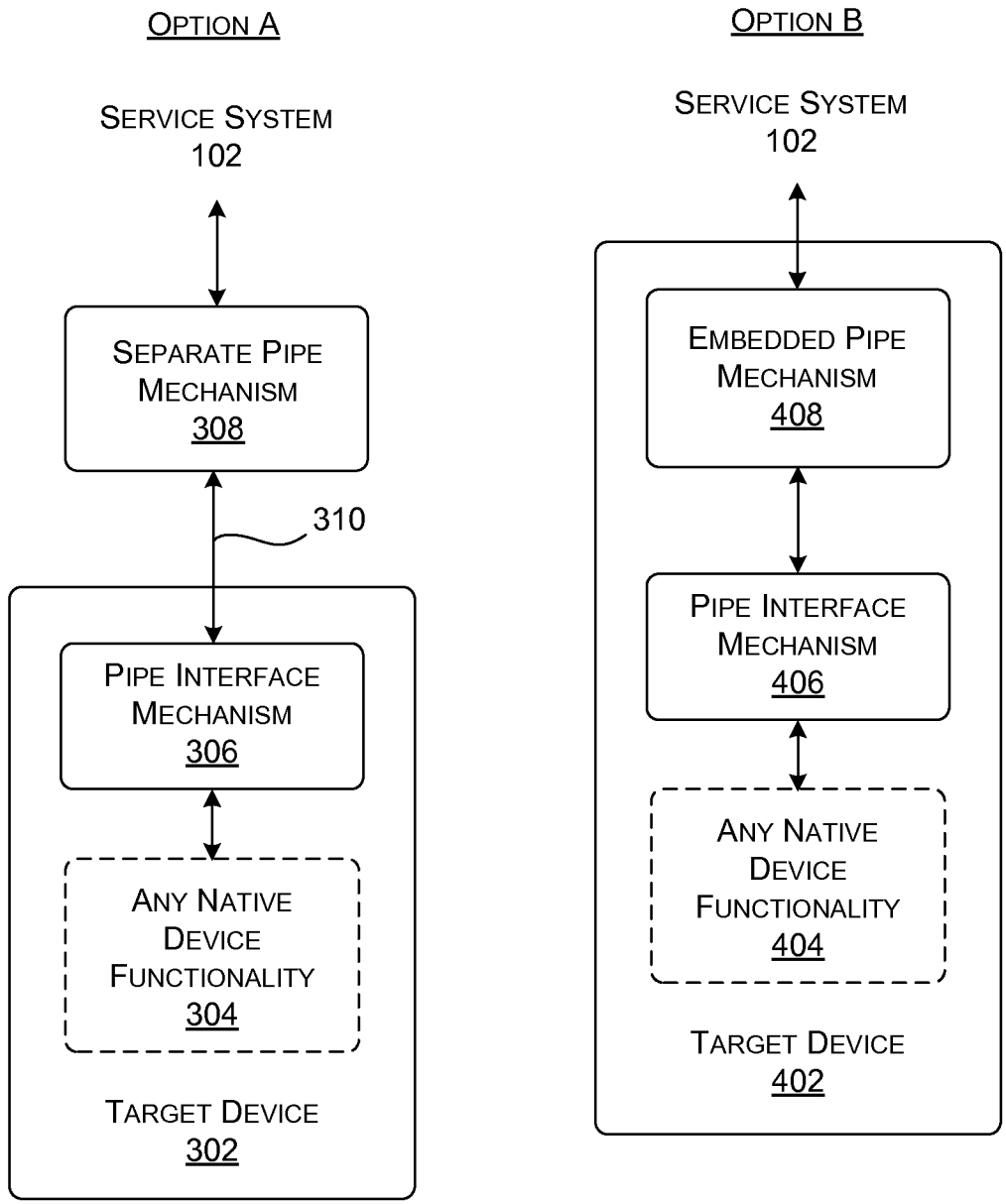
FIGS. 3-5 show three different options for coupling a pipe mechanism to a target device.

In FIG. 3, the pipe mechanism 308 and the target device 302 are separate components. The pipe mechanism 308 can be detachably connected to the target device 302 at any stage, e.g., during assembly of the target device 302 at a manufacturing site, or at the end user's site. The pipe mechanism 308 can couple to the pipe interface mechanism 306 using any connection strategy, generically denoted in FIG. 3 as a connection 310. For example, the connection 310 may represent a plug-type outlet that receives a chip-type pipe mechanism. Or the connection 310 may represent a cable-type connection or a wireless connection, and so on.

FIG. 4 shows a target device 402 having native functionality 404, a pipe interface mechanism 406, and a pipe mechanism 408. These modules may perform the same functions as the same-named components of FIG. 3. But in the case of FIG. 4, the pipe mechanism 408 corresponds to an embedded component of the target device 402, rather than a readily-detachable component that is considered separate from the target device 402. For example, the pipe mechanism 408 may represent a chip that is hardwired to a substrate provided in the target device 402 (such as, in more complex target devices, a printed circuit board, etc.).

Figure 5:
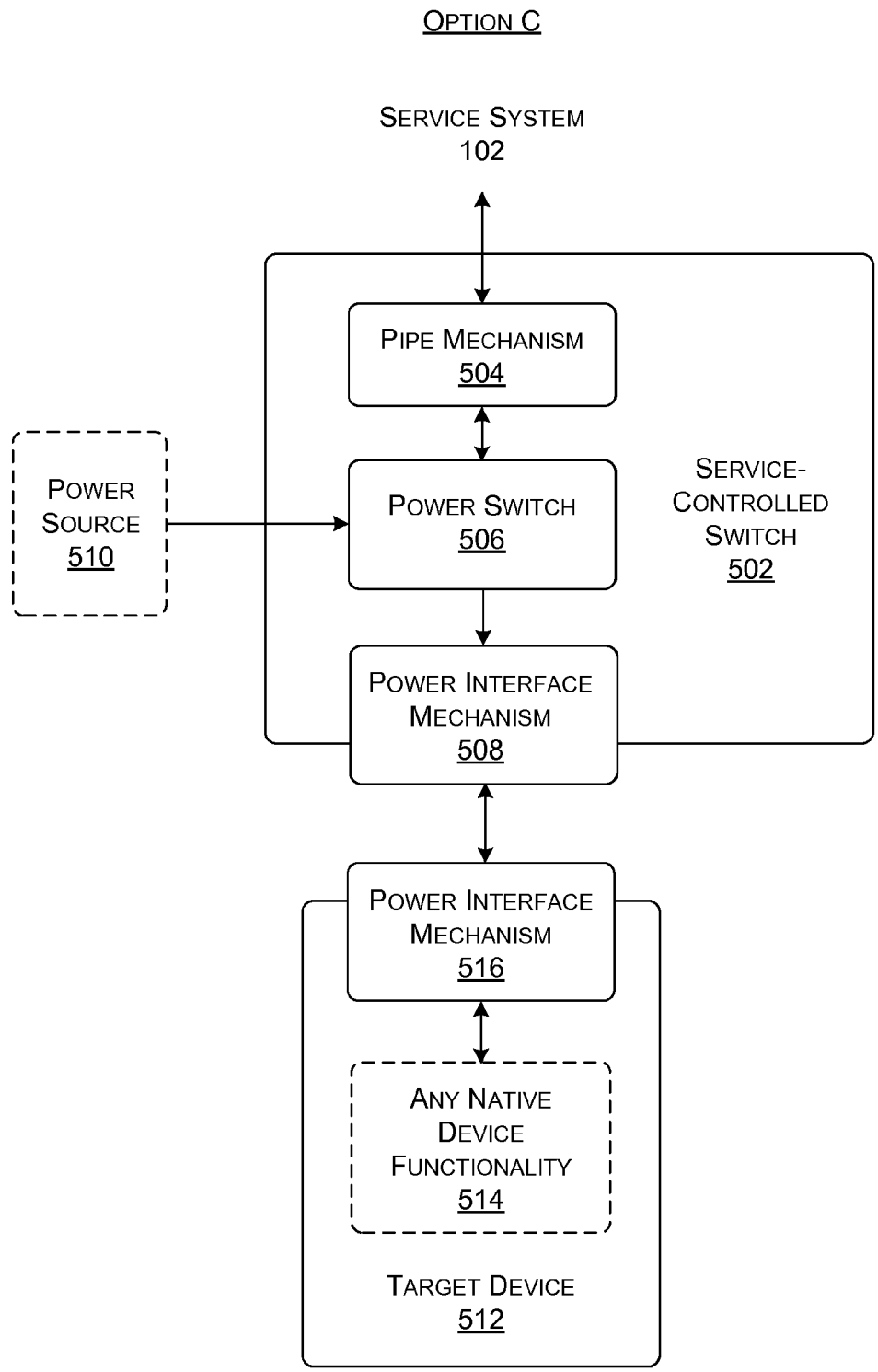

FIG. 5 shows a service-controlled switch 502 that incorporates a pipe mechanism 504, a power switch 506, and a power interface mechanism 508. The power switch 506 is coupled to a power source 510, such as an AC wall outlet. The power switch 506 receives control instructions from the service system 102. Those instructions cause the power switch 506 to toggle the power on and off. When in an "on" state, the power switch 506 directs power from the power source 510 to the power interface mechanism 508; when in an "off" state, the power switch 506 turns off the power to the power interface mechanism 508.

A separate target device 512 may include any native device functionality 514 and a power interface mechanism 516. The power interface mechanism 516 of the target device 512 can be coupled to the power interface mechanism 508 of the service-controlled switch 502. In this coupled state, the power switch 506 can effectively control the application of power to the target device 512, based on control instructions received by the pipe mechanism 504. In one particular implementation, the service-controlled switch 502 comprises a small unit having a male plug that may be inserted into an AC power outlet. The service-controlled switch 502 provides a female plug (associated with the power interface mechanism 508) for mating with a male plug (associated with the power interface mechanism 516) of the target device 512 (or vice versa).

More broadly stated, FIG. 5 is an example of a class of control devices that can control a separate target device in any manner. In another case, for example, the control device can provide a multi-valued output (either continuous or discrete) based on control instructions received by the pipe mechanism. This kind of control device can control any type of target device that accepts a multi-valued input signal, such as a thermostat.

Figure 6:
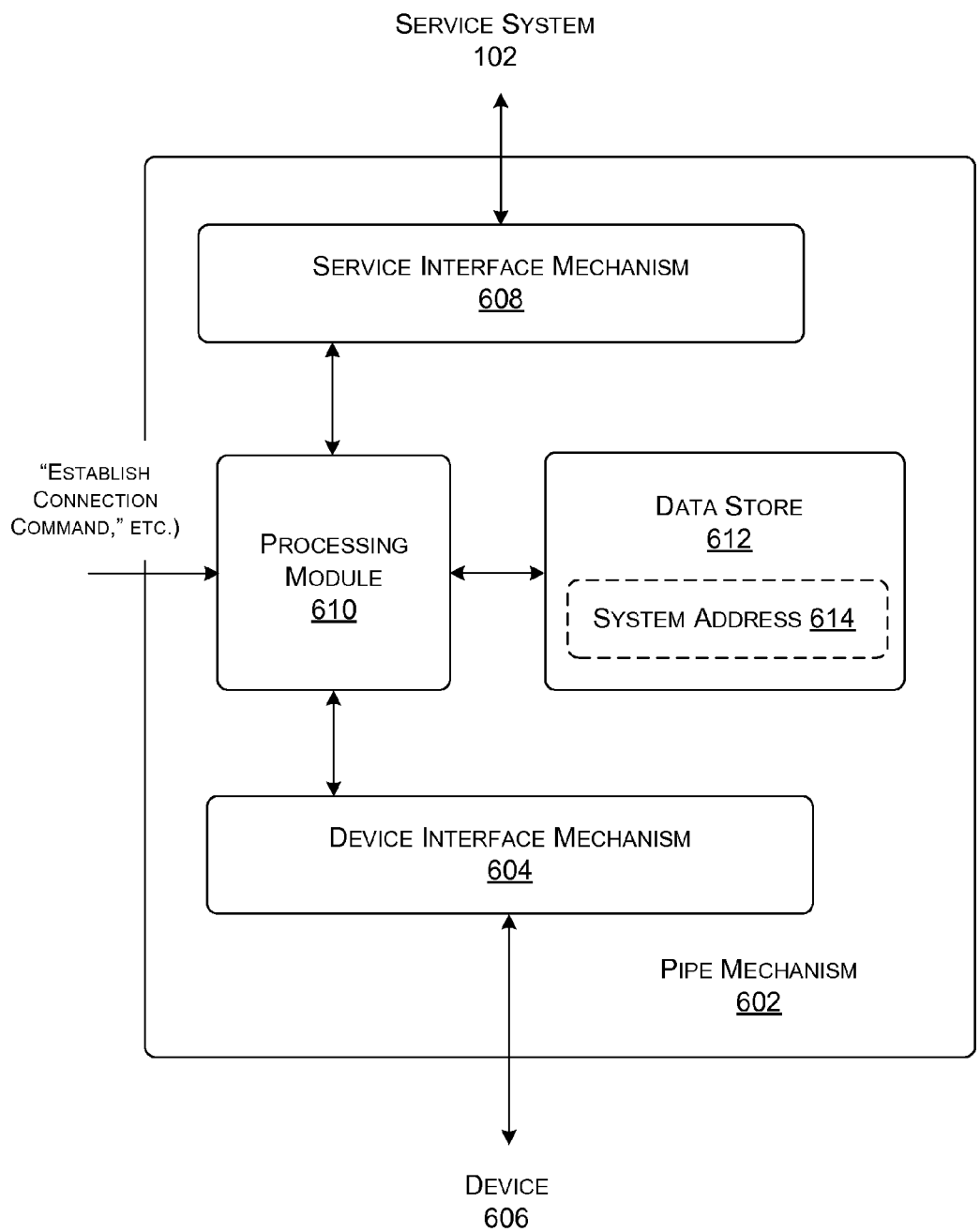
FIG. 6 shows one implementation of a pipe mechanism.

FIG. 6 shows one implementation of a pipe mechanism 602. The pipe mechanism 602 includes a device interface mechanism 604 for interacting with a target device 606, and a service interface mechanism 608 for interacting with the service system 102. The device interface mechanism 604 can be implemented in any manner, such as by interface pins provided by a chip, a male or female connection member, a relay, etc. The service interface mechanism 608 can likewise be implemented in different ways depending on the manner in which the pipe mechanism 602 is connected to the communication mechanism 112. For example, the service interface mechanism 608 can provide cell-based logic for providing cellular communication, WiFi logic for providing WiFi communication, and so on. Or the service interface mechanism 608 can include logic for establishing a hardwired-type connection of any type.

More specifically, in a first embodiment, different classes of pipe mechanisms can be provided that include different types of service interface mechanisms. The different types of service interface mechanisms can handle different types of communications (e.g., cellular, WiFi, etc.) and/or different transfer strategies (e.g., continuous, intermittent, etc.). A device manufacturer or end user can choose the appropriate class of pipe mechanism for use with a particular type of target device that is to be controlled. In a second implementation, a single type of pipe mechanism can be provided that offers a multi-mode service interface mechanism 608, where each mode offers a different type of communication and/or a different transfer strategy. A device manufacturer or end user can then select the appropriate mode for use with a particular target device to be controlled. For example, a device manufacturer can configure the pipe mechanism to provide intermittent WiFi communication with the service system 102.

The pipe mechanism 602 can also include a processing module 610 that governs it operation. The processing module 610 may correspond to one or more microprocessors and/or hardwired logic circuitry. For example, the processing module 610 can include transfer logic which governs the transfer of instructions from the service interface mechanism 608 to the device interface mechanism 604, and the flow of data from the device interface mechanism 604 to the service interface mechanism 608. The processing module 610 can also include security logic for establishing a secure connection with the service system 102. Other than these types of communication-related functions, in one implementation, the processing module 610 remains agnostic as to the meaning of the information that flows through the pipe mechanism 602. That is, in this case, the processing module 610 is not adapted for any particular target device or any particular control function.

The processing module 610 may perform its tasks based on information stored in a data store 612. For example, the data store 612 may store an address 614 associated with the service system 102, such as a URL address. This information allows the pipe mechanism 602 to connect to the service system 102.

Although not shown, the data store 612 may also store any kind of identification information, such as one or more identification codes, security-related information, certificates, etc. The identification information may identify the pipe mechanism 602. And if the pipe mechanism 602 is a fixed component of a target device, the identification information also implicitly identifies the target device. The pipe mechanism 602 may append some of this identification information as a header to data that it forwards to the service system 102. This will allow the service system 102 to identify the source of the data. The processing module 610 can also receive any identification and/or security-related information from any source, such as the system management module 124, and then store this information in its data store 612.

The pipe mechanism 602 may optionally incorporate other functions and associated inputs. For example, the pipe mechanism 602 can include a "connect" button or the like. An end user can activate this button to instruct the pipe mechanism 602 to connect to the service system 102 via the communication mechanism 112.

Figure 7:
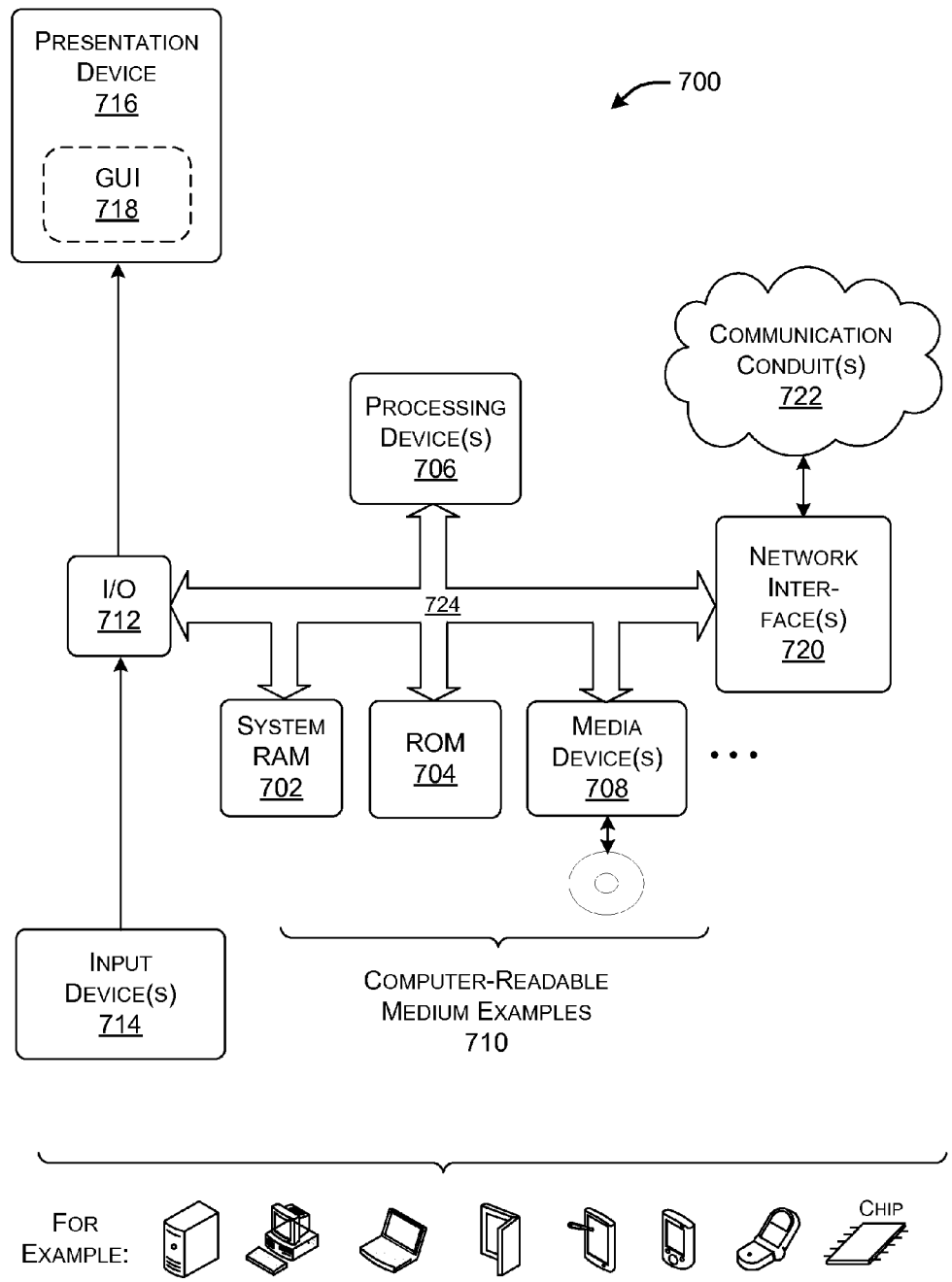
FIG. 7 shows one implementation of computing functionality that can be used to provide the service system, or a user device which interacts with the service system.

FIG. 7 sets forth illustrative computing functionality 700 that can be used to implement any aspect of any user device, or any aspect of any server provided by the service system 102.

The computing functionality 700 can include volatile and non-volatile memory, such as RAM 702 and ROM 704, as well as one or more processing devices 706 (e.g., one or more CPUs, and/or one or more GPUs, etc.). The computing functionality 700 also optionally includes various media devices 708, such as a hard disk module, an optical disk module, and so forth. The computing functionality 700 can perform various operations identified above when the processing device(s) 706 executes instructions that are maintained by memory (e.g., RAM 702, ROM 704, or elsewhere).

More generally, instructions and other information can be stored on any computer readable medium 710, including, but not limited to, static memory storage devices, magnetic storage devices, optical storage devices, and so on. The term computer readable medium also encompasses plural storage devices. In many cases, the computer readable medium 710 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 700 also includes an input/output module 712 for receiving various inputs (via input devices 714), and for providing various outputs (via output devices). Illustrative input devices include a keyboard device, a mouse input device, a touchscreen input device, a gesture input device, a voice recognition mechanism, tabletop or wall-projection input mechanisms, and so on. One particular output mechanism may include a presentation device 716 and an associated graphical user interface (GUI) 718. The computing functionality 700 can also include one or more network interfaces 720 for exchanging data with other devices via one or more communication conduits 722. One or more communication buses 724 communicatively couple the above-described components together.

The communication conduit(s) 722 can be implemented in any manner, e.g., by a local area network, a wide area network (e.g., the Internet), etc., or any combination thereof. The communication conduit(s) 722 can include any combination of hardwired links, wireless links, routers, gateway functionality, name servers, etc., governed by any protocol or combination of protocols.

Alternatively, or in addition, any of the functions provided by the computing functionality 700 can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

B. Illustrative Processes

FIGS. 8-12 show procedures that explain one manner of operation of the environment 100 of FIG. 1. Since the principles underlying the operation of the environment 100 have already been described in Section A, certain operations will be addressed in summary fashion in this section.

Figure 8:
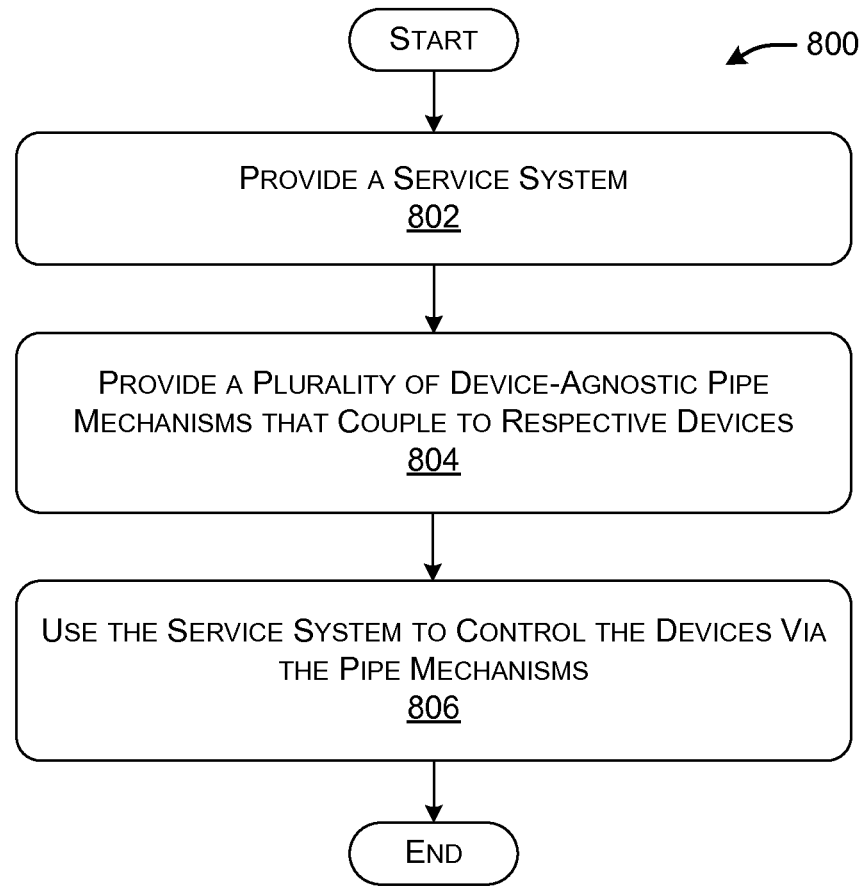
FIG. 8 is a procedure which describes a strategy for controlling target devices using the environment of FIG. 1.

Starting with FIG. 8, this figure shows an illustrative procedure 800 for providing the environment 100. In block 802, the service system 102 is provided. For instance, the service system 102 may be implemented as a cloud computing resource, or in some other manner. In block 804, a plurality of device-agnostic pipe mechanisms 106 are provided for use in association with respective target devices 104. FIG. 2 sets forth two strategies for accomplishing this task. In block 806, the service system 102 is used to control the target devices 104 via the pipe mechanisms 106. The operations of FIG. 8 can be performed by one or more entities. For example, in one representative case, a first entity can perform blocks 802 and 806, while a second entity can perform block 804.

Figure 9:
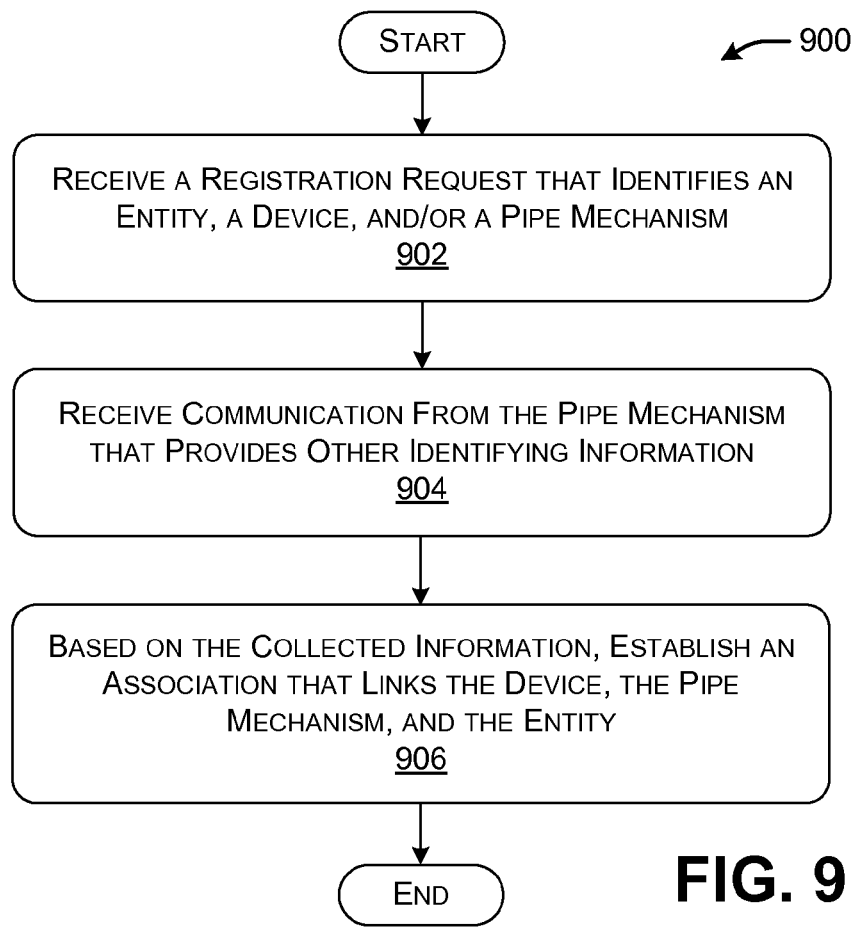
FIG. 9 is a procedure which describes one way of establishing an association that links a target device, a pipe mechanism, and a user account.

FIG. 9 shows an illustrative procedure 900 for associating a device and a pipe mechanism with a user. In block 902, the service system 102 can receive a registration request which identifies one or more of: (1) an entity (e.g., a user) which owns or otherwise is authorized to control a target device; (2) the target device; and/or (3) the pipe mechanism associated with the target device. For example, a user may perform this task by using a user device to log onto a web site associated with the system management module 124. The user may identify himself or herself (e.g., by providing a user ID and password), and then provide a code associated with the pipe mechanism and/or a code associated with the target device. In block 904, the service system 102 may receive a communication from the pipe mechanism under consideration. The communication may provide additional identifying information regarding the pipe mechanism and/or the target device. In block 906, the service system 102 can use the information collected in blocks 902 and 904 to establish a nexus between the user, a target device, and the pipe mechanism that is coupled to the target device. FIG. 9 shows that block 902 precedes block 904, but block 904 may alternatively follow block 902.

Figure 10:
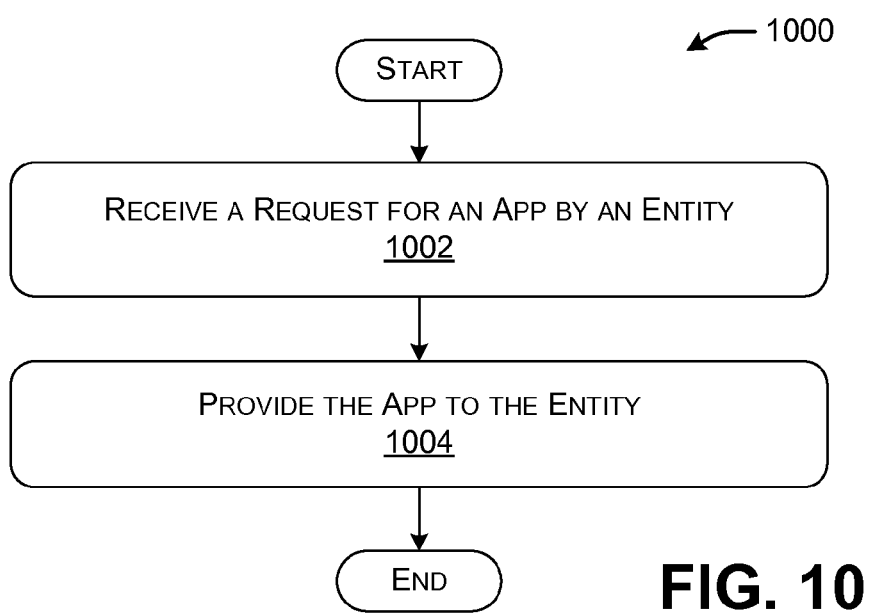
FIG. 10 is a procedure which describes one way of providing an application to an entity, for use by the entity in interacting with a service.

FIG. 10 shows a procedure 1000 for downloading an application from the service system 102 to a user device. In block 1002, the service system 102 receives a request from a user for an application. In block 1004, the service system 102 provides the requested application.

Figure 11:
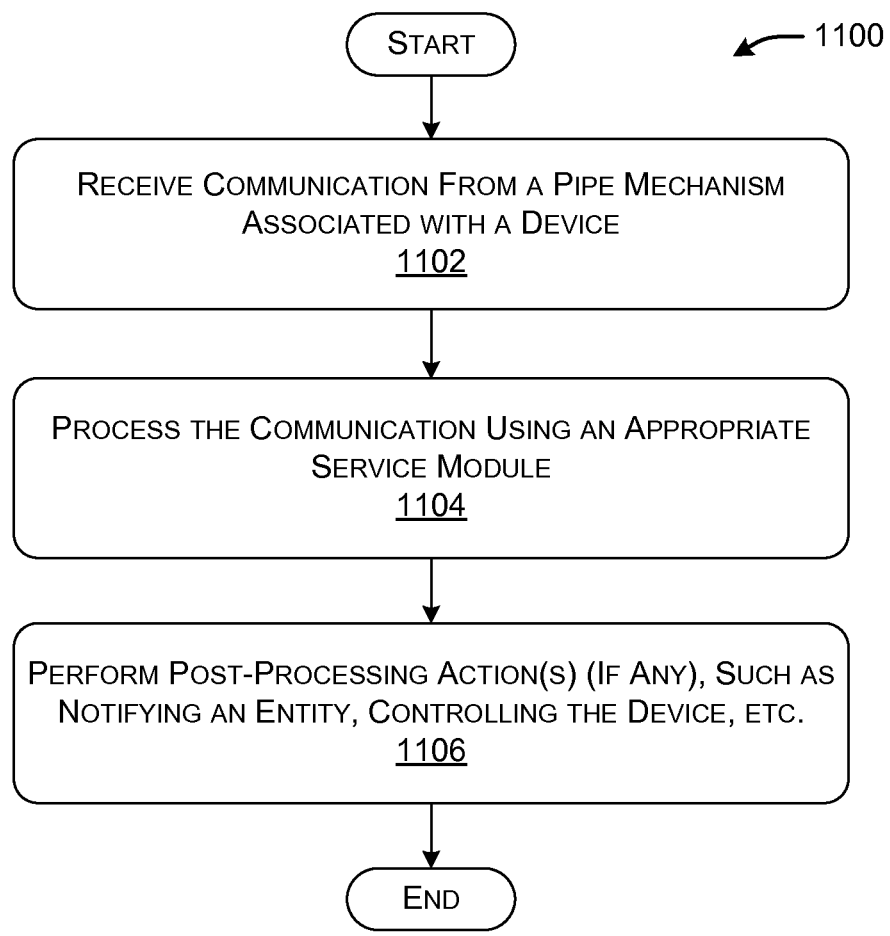
FIG. 11 is a procedure which describes one way of handling communication in which data flows from the target devices to the service system.

FIG. 11 shows a procedure 1100 for uploading data from a pipe mechanism to the service system 102. In block 1102, the service system 102 receives a communication from the pipe mechanism associated with a device. This communication can be received via any transfer protocol, e.g., using a continuous connection protocol or an intermittent queuing protocol. In block 1104, the service system 102 processes the communication using an appropriate service module. In block 1106, the service system 102 can perform any post-processing action(s), such as notifying a user of the data that has been received, controlling the target device based on the data, and so on. To perform a control action, the service system 102 can use any connection protocol to forward instructions to the pipe mechanism, such as a continuous connection protocol or an intermittent connection protocol.

Figure 12:
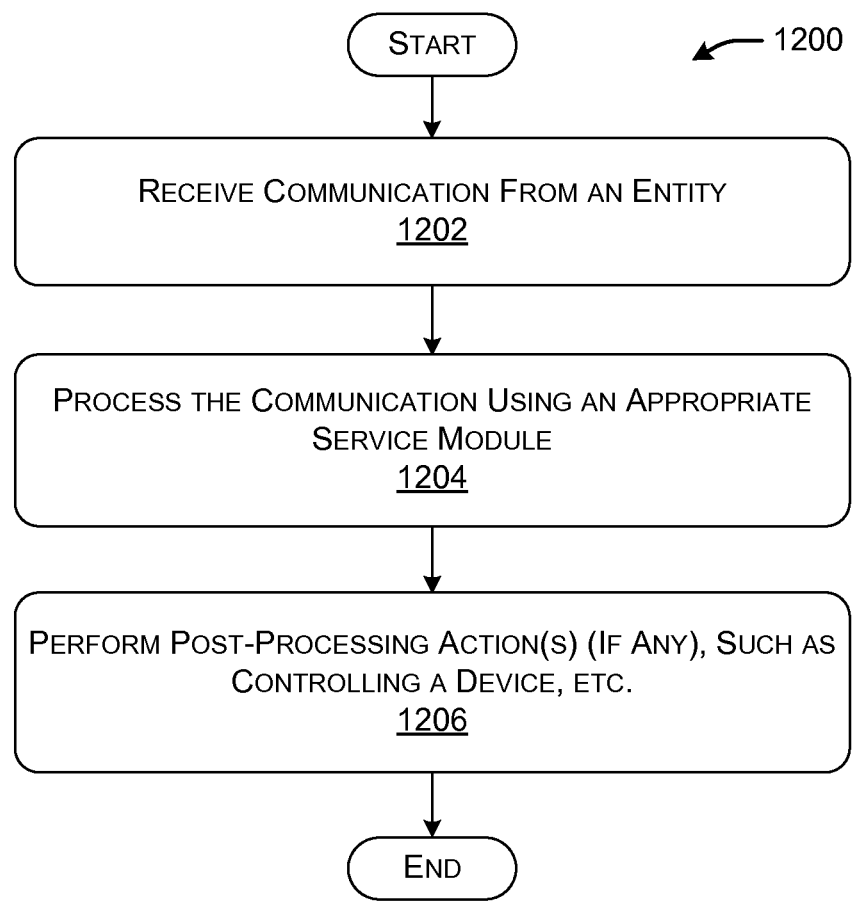
FIG. 12 is a procedure which describes one way of handling communication in which a user interacts with the service system.

FIG. 12 shows a procedure 1200 for providing configuration instructions from an entity to the service system 102. In block 1202, the service system 102 receives configuration instructions from an entity, such as a user. The user may enter those instructions by interacting with an application running on a user device. In block 1204, the service system 102 processes the instructions using an appropriate service module. In block 1206, the service system 102 can provide any post-processing action(s), such as by controlling a target device associated with the user, etc. As stated above, the service system 102 can use any connection protocol to forward instructions to the pipe mechanism associated with the target device, such as a continuous connection protocol or an intermittent connection protocol.

In closing, functionality described herein can employ various mechanisms to ensure the privacy of user data maintained by the functionality, if any. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A service system comprising:
   a plurality of service modules configured to provide a plurality of respective services, the services, in turn, for use in controlling a plurality of target devices that lack local control logic;
   a controlled device interface module configured to allow the target devices to interact with the services via a plurality of physical pipe mechanisms that are mechanically connected to the respective target devices that lack local control logic;
   a user device interface module configured to allow a plurality of user devices to interact with the services; and
   one or more computer devices configured to execute the plurality of service modules, the controlled device interface module, and the user device interface module,
   the service system being accessible to the physical pipe mechanisms via a wide area network,
   wherein the plurality of physical pipe mechanisms implement different respective communication classes including a first communication class and a second communication class, and
   the controlled device interface module is further configured to control a first target device by communicating with a first physical pipe mechanism according to the first communication class and to control a second target device by communicating with a second physical pipe mechanism according to the second communication class.

2. The service system of claim 1, further comprising the plurality of physical pipe mechanisms, wherein each physical pipe mechanism incorporates device-agnostic functionality that enables the physical pipe mechanism to interact with plural kinds of target devices.

3. The service system of claim 1, further comprising the plurality of physical pipe mechanisms, wherein each physical pipe mechanism incorporates control-agnostic functionality that enables the physical pipe mechanism to be used with plural services that provide different respective control functions.

4. The service system of claim 1, wherein the target devices include:
an item of kitchen equipment mechanically connected to and controlled by the first physical pipe mechanism,
an item of bathroom equipment mechanically connected to and controlled by the second physical pipe mechanism,
an item of irrigation equipment mechanically connected to and controlled by a third physical pipe mechanism, and
a garage door opener mechanically connected to and controlled by a fourth physical pipe mechanism.

5. The service system of claim 1, further including a device driver module configured to convert control instructions provided by the services into appropriate forms for use by different kinds of target devices.

6. The service system of claim 1, wherein the first communication class uses a continuous transfer strategy and the controlled device interface module is configured to interact with the first target device on a continuous-connection basis.

7. The service system of claim 6, wherein the second communication class uses an intermittent transfer strategy and the controlled device interface module is configured to interact with the second target device on an intermittent-connection basis by queuing instructions to be passed to the second physical pipe mechanism until a later time when a connection is established.

8. The service system of claim 1, further including a system management module configured to establish a plurality of associations, each association linking a particular target device, a particular physical pipe mechanism that couples to the particular target device, and a particular entity that is authorized to control the particular target device.

9. A physical pipe mechanism for providing interaction between a remote service system and a target device, the physical pipe mechanism comprising:
a device interface mechanism configured to control application of electrical power to the target device;
a multi-mode service interface mechanism configured to selectively communicate with the remote service system according to different respective communication classes, including a first communication class and a second communication class, based on a received selection, the remote service system having at least one service that is configured to provide control instructions to the physical pipe mechanism; and
a processing module configured to control operation of the physical pipe mechanism responsive to the control instructions received from the remote service system.

10. The physical pipe mechanism of claim 9, wherein the physical pipe mechanism is configured to control the application of electrical power to the target device via a switch.

11. The physical pipe mechanism of claim 9, wherein the physical pipe mechanism is an embedded component within the target device.

12. The physical pipe mechanism of claim 9, wherein the first communication class is a cellular communication class that configures the physical pipe mechanism to communicate with the remote service system using cellular communication and the second communication class is a Wi-Fi communication class that configures the physical pipe mechanism to communicate with the remote service system using Wi-Fi.

13. The physical pipe mechanism of claim 9, wherein the first communication class is a continuous communication class that configures the physical pipe mechanism to communicate with the remote service system on a continuous basis and the second communication class is an intermittent communication class that configures the physical pipe mechanism to communicate with the remote service system on an intermittent basis.

14. A method comprising:
providing a service system implemented by one or more servers, the service system providing a plurality of service modules, each service module providing a service; and
using the service system to control a plurality of target devices that lack local control logic via a plurality of physical pipe mechanisms which mechanically couple to the target devices, wherein the service system is configured to control the plurality of target devices by sending instructions over a wide area network from the service system to the plurality of physical pipe mechanisms that are mechanically coupled to the plurality of target devices,
the instructions being sent according to different communication classes including a first communication class and a second communication class, and
wherein the using the service system includes controlling a first one of the target devices by communicating with a first physical pipe mechanism according to the first communication class and controlling a second one of the target devices by communicating with a second physical pipe mechanism according to the second communication class.

15. The method of claim 14, wherein the physical pipe mechanisms share identical device-agnostic functionality.

16. The method of claim 14, wherein the instructions control application of electrical power to the plurality of target devices by corresponding switches controlled by the physical pipe mechanisms.

17. The method of claim 14, wherein the first communication class involves using a push-based technique where the service system initiates sending the instructions to the first physical pipe mechanism.

18. The method of claim 17, wherein the second communication class involves using a pull-based technique where the second physical pipe mechanism service system initiates receiving the instructions from the service system.

19. The method of claim 14, further comprising:
receiving a request for an application by an entity, the application allowing the entity to interact with an individual target device via an individual service module provided by the service system; and
providing the application to the entity in response to the request.

20. The method of claim 14, wherein each physical pipe mechanism includes:
a device interface mechanism configured to communicate with a corresponding target device;

a service interface mechanism configured to communicate with the service system;

a processing module configured to control operation of the physical pipe mechanism; and a data store for storing data for use in controlling operation of the physical pipe mechanism.

\* \* \* \* \*